United States Patent [19]

Mazeau et al.

[11] Patent Number: 4,746,633
[45] Date of Patent: May 24, 1988

[54] FAST FADING PHOTOCHROMIC GLASS

[75] Inventors: Jean-Pierre Mazeau; Michel Prassas, both of Avon, France

[73] Assignee: Corning Glass Works, Corning, N.Y.

[21] Appl. No.: 827,939

[22] Filed: Feb. 10, 1986

[30] Foreign Application Priority Data

Jul. 11, 1985 [FR] France ............... 85 10626

[51] Int. Cl.$^4$ .......... C03C 4/06; C03C 3/11
[52] U.S. Cl. ............... 501/13; 501/56
[58] Field of Search ............... 501/13, 56

[56] References Cited

U.S. PATENT DOCUMENTS

| | | | |
|---|---|---|---|
| 3,998,647 | 12/1976 | Yameshita et al. | 501/13 |
| 4,001,019 | 1/1977 | Yamashita et al. | 501/13 |
| 4,018,965 | 4/1977 | Kerko et al. | 501/13 |
| 4,102,693 | 7/1978 | Owen et al. | 501/13 |
| 4,130,437 | 12/1978 | Mazeau et al. | 501/13 |
| 4,190,451 | 2/1980 | Hares et al. | 501/13 |
| 4,251,278 | 2/1981 | Hares | 501/13 |
| 4,282,021 | 8/1981 | Mazeau et al. | 501/13 |
| 4,358,542 | 11/1982 | Hares et al. | 501/13 |
| 4,374,931 | 2/1983 | Courbin et al. | 501/13 |
| 4,390,635 | 6/1983 | Morgan | 501/13 |
| 4,407,966 | 10/1983 | Kerko et al. | 501/13 |
| 4,549,894 | 10/1985 | Araujo et al. | 501/13 |
| 4,550,087 | 10/1985 | Kerko et al. | 501/13 |
| 4,608,349 | 8/1986 | Kerko et al. | 501/13 |

FOREIGN PATENT DOCUMENTS 2016441  9/1979  United Kingdom ............ 501/13

Primary Examiner—Mark L. Bell
Attorney, Agent, or Firm—Clinton S. Janes, Jr.

[57] ABSTRACT

This invention is directed to transparent photochromic glasses that can darken to a comfort range, i.e., between about 35–60%, or to a dark range, i.e., below 35%, depending upon glass composition, and will exhibit a faded transmittance after five minutes' removal from actinic radiation higher than 70%. The base compositions of the glasses consist essentially, in weight percent, of about

| | | | |
|---|---|---|---|
| $SiO_2$ | 46–60 | MgO | 0–3.5 |
| $B_2O_3$ | 16–28 | CaO | 0–6 |
| $Al_2O_3$ | 4–11 | SrO | 0–6 |
| $ZrO_2$ | 2–6 | BaO | 0–6 |
| $Al_2O_3 + ZrO_2$ | 6–13 | MgO + CaO + SrO + BaO | 0–7 |
| $Li_2O$ | 2–5 | $P_2O_5$ | 0–5 |
| $Na_2O$ | 0–4 | $TiO_2$ | 0–3 |
| $K_2O$ | 2.5–9 | | |

For a comfort glass the photochromic elements consist essentially, as analyzed, of

| | | | |
|---|---|---|---|
| Ag | 0.13–0.18 | Br | 0.08–0.14 |
| Cl | 0.16–0.34 | CuO | 0.001–0.004 |

For a dark glass the photochromic elements consist essentially, as analyzed, of

| | | | |
|---|---|---|---|
| Ag | 0.15–0.3 | Br | 0.07–0.14 |
| Cl | 0.2–0.45 | CuO | 0.004–0.016 |

8 Claims, No Drawings

FAST FADING PHOTOCHROMIC GLASS

FIELD OF THE INVENTION

The present invention is related to the preparation of transparent photochromic glasses suitable for the production of ophthalmic and non-prescription lenses which demonstrate the characteristic of very rapid fading. In the present context it will be understood that rapidly fading glasses are glasses which exhibit a luminous transmittance at ambient temperature greater than about 70% five minutes after having been removed from a source of actinic radiation.

BACKGROUND OF THE INVENTION

Photochromic glasses, phototropic glasses, and reversibly darkening glasses, as such have been variously termed, had their genesis somewhat over twenty years ago. U.S. Pat. No. 3,208,860 described such glasses as exhibiting the capability of changing color (darkening) when exposed to actinic radiation (conventionally ultraviolet radiation), and of returning to their original color (fading to their original optical transmittance) when removed from the actinic radiation. That patent is directed generally to silicate base glass compositions wherein silver chloride and/or silver bromide and/or silver iodide crystals impart the photochromic effect to the glass. The preferred base compositions were located in the alkali metal aluminoborosilicate system.

Numerous patents have issued subsequently directed to specifically-defined areas of silicate glass compositions which demonstrated exceptional photochromic behavior and/or other unusual physical and/or chemical properties. To data, the most prevalent commercial use of photochromic glass has been in the field of ophthalmic lenses. As can be appreciated, glasses designed for that application must comply with a host of chemical and physical properties to meet industry-wide specifications. For example, the glasses must manifest melting and forming characteristics rendering them capable of mass producing lenses utilizing techniques conventional in the glass art. Also, the glasses must resist attack by acids and bases as required by the industry. The glasses must display various optical properties, e.g., refractive index, dispersion, excellent transparency, etc. Consequently, photochromic glasses destined for ophthalmic use have, perforce, been the result of a compromise between the phothchromic behavior demonstrated and the above-discussed matrix of chemical and physical properties.

In general, the latterly-issued patents have been drawn to narrowly-defined areas of silicate-based compositions which are asserted to exhibit superior photochromic properties. Customarily, the goal of those patents has been to devise glasses which would quickly darken to low transmittances upon exposure to actinic radiation and would rapidly fade to their original transmittance upon removal from the actinic radiation. The drive to increase the rate of fading has been the subject of much research.

The following are exemplary of such research:

U.S. Pat. No. 3,795,523 describes glasses consisting essentially, in weight percent, of 50-70% $SiO_2$, 10-26% $B_2O_3$, 6-14% $Al_2O_3$, 5-15% alkali metal oxides including $K_2O$ and $Li_2O$ in the ratio $Li_2O:K_2O$ of 1:01-1:07, with the sum of alkali metal oxides other than $K_2O$ and $Li_2O$ being less than the level of $Li_2O$, 0.005-0.03% CuO, 0.05-1% Ag, and Cl and/or Br and/or I being present in at least an amount sufficient to react stoichiometrically with the Ag. In one working example, a glass displaying an initial transmittance of 88% darkened to a transmittance of 52.2% after an exposure of 1.5 minutes to ultraviolet light, and returned to a transmittance of 88% after 3 minutes' removal from the light.

U.S. Pat. No. 3,833,511 discloses glasses consisting essentially, in weight percent, of 48-60% $SiO_2$, 7-11% $Al_2O_3$, 17-31% $B_2O_3$, 10-16% $K_2O$, 0.5-5% BaO, with the ratio $BaO:K_2O$ being 0.05-0.4, 0.15-0.7% Ag, and Cl and/or Br and/or I being present in at least an amount sufficient to react stoichiometrically with the Ag. In one working example, the glass darkened from an initial transmittance of about 92% to about 40% within about 2 minutes, and faded to its original transmittance in less than 5 minutes.

U.S. Pat. No. 3,998,647 is concerned with photochromic glasses refractive index corrected for ophthalmic applications consisting essentially, in weight percent, of

| $SiO_2$ | 48-62 | BaO | 0.5-7 |
|---|---|---|---|
| $B_2O_3$ | 15-22 | $BaO:R_2O$ | 0.035-0.65 |
| $Al_2O_3$ | 0-7 | $TiO_2$ | 0-2 |
| $ZrO_2$ | 0-10 | CuO | 0.002-0.03 |
| $Al_2O_3 + ZrO_2$ | 6-12 | Ag | 0.15-1 |
| $Li_2O$ +/or $Na_2O$ +/or $K_2O$ | 6-16 | | | and wherein Cl and/or Br and/or I will be present in more than the stoichiometric amount to react with the Ag. In one working example, the glass darkened from an initial transmittance of about 92% to about 35% in 10 minutes and returned to about 90% of its original transmittance in no more than 10 minutes.

U.S. Pat. No. 4,001,019 presents photochromic glasses refractive index corrected for ophthalmic applications consisting essentially, in weight percent, of

| $SiO_2$ | 48-62 | $TiO_2$ | 0-10 |
|---|---|---|---|
| $Al_2O_3$ | 7-15 | $ZrO_2$ | 0-10 |
| $B_2O_3$ | 17-26 | $Nb_2O_5$ | 0-5 |
| $Li_2O$ +/or $Na_2O$ +/ or $K_2O(R_2O)$ | 6-16 | $TiO_2 + ZrO_2 + Nb_2O_5$ | 0.5-15 |
| BaO | 0.5-5 | $As_2O_3$ | 0-2 |
| $BaO:R_2O$ | 0.05-0.4 | $Sb_2O_3$ | 0-2 |
| AgO | 0.15-1 | $As_2O_3 + Sb_2O_3$ | <2 | and wherein Cl and/or Br and/or I will be included in at least an amount sufficient to react stoichiometrically with the Ag. After darkening, the glasses are asserted to return to about 90% of their original transmittance within 20 minutes.

U.S. Pat. No. 4,018,965 is directed to photochromic glasses refractive index corrected and chemically strengthenable for ophthalmic applications consisting essentially, in weight percent, of

| $SiO_2$ | 54-66 | PbO | 0-3 |
|---|---|---|---|
| $Al_2O_3$ | 7-15 | Ag | 0.1-1 |
| $B_2O_3$ | 10-25 | Cl | 0.1-1 |
| $Li_2O$ | 0.5-4 | Br | 0-3 |
| $Na_2O$ | 3.5-15 | CuO | 0.008-0.16 |
| $K_2O$ | 0-10 | F | 0-2.5 |
| $Li_2O + Na_2O + K_2O$ | 6-16 | | |

The glasses are averred to darken below 25% and demonstrate a fading rate such that, after 5 minutes' removal from actinic radiation, they will exhibit a transmittance 1.5 times the darkened transmittance.

U.S. Pat. No. 4,102,693 is drawn to photochromic glasses which may be refractive index corrected for ophthalmic applications consisting essentially, in weight percent, of

| $SiO_2$ | 31–59 | $ZrO_2$ | 0–7 |
| $Al_2O_3$ | 8–20 | $TiO_2$ | 0–5 |
| $B_2O_3$ | 18–28 | PbO | 0–7 |
| $Li_2O$ | 0–3 | $Ag_2O$ | 0.05–4 |
| $Na_2O$ | 0–8 | CuO | 0–1 |
| $K_2O$ | 0–16 | Cl | 0–04–0.5 |
| $Li_2O + Na_2O + K_2O$ | 6–16 | Br | 0–1 |
| MgO | 0–2.6 | F | 0–0.2 |
| $P_2O_5$ | | Cl + Br + F | 0.13–1 |

The glasses are stated to manifest a half fading time (the period required to fade from the darkened state to a condition in which one-half of the lost light transmission has been restored) of not more than one minute.

U.S. Pat. No. 4,130,437 claims photochromic glasses refractive index corrected and chemically strengthenable for ophthalmic applications consisting essentially, in weight percent, of

| $SiO_2$ | 54–66 | PbO | 0–1.25 |
| $Al_2O_3$ | 7–15 | Ag | 0.1–0.3 |
| $B_2O_3$ | 10–25 | Cl | 0.2–1 |
| $Li_2O$ | 0.5–4 | Br | 0–0.3 |
| $Na_2O$ | 3.5–15 | CuO | 0.002–0.02 |
| $K_2O$ | 0–10 | F | 0–2.4 |
| $Li_2O + Na_2O + K_2O$ | 6–16 | | |

At about room temperature the glasses will darken to a transmittance below 30% and will fade within five minutes to a transmittance at least 1.75 times that of the darkened transmittance after withdrawal from actinic radiation.

U.S. Pat. No. 4,190,451 defines photochromic glasses refractive index corrected and chemically strengthenable for ophthalmic applications consisting essentially, in weight percent, of

| $Li_2O$ | 0–2.5 | $SiO_2$ | 20–65 |
| $Na_2O$ | 0–9 | CuO | 0.004–0.02 |
| $K_2O$ | 0–17 | Ag | 0.15–0.3 |
| $Cs_2O$ | 0–6 | Cl | 0.1–0.25 |
| $Li_2O + Na_2O + K_2O + Cs_2O$ | 9–20 | Br | 0.1–0.2 |
| $B_2O_3$ | 14–23 | Ag:(Cl + Br) | 0.65–0.95 |
| $Al_2O_3$ | 5–25 | Mole ratio $R_2O:B_2O_3$ | 0.55–0.85 |
| $P_2O_5$ | 0–25 | | |

Optional ingredients include 0–6% $ZrO_2$, 0–3% $TiO_2$, 0–0.5% PbO, 0–7% BaO, 0–4% CaO, 0–3% MgO, 0–6% $Nb_2O_5$, and 0–4% $La_2O_3$, the total of such optional additions not exceeding about 10%. At about room temperature the glasses will darken to a transmittance below 40% and will fade at least 30 percentage units of transmittance after 5 minutes' removal from actinic radiation.

U.S. Pat. No. 4,358,542 delineates photochromic glasses refractive index corrected and chemically strengthenable for ophthalmic applications consisting essentially, in weight percent, of

| $SiO_2$ | 55–60 | PbO | 0.1–0.25 |
| $Al_2O_3$ | 9–10 | Ag | 0.1–0.15 |
| $B_2O_3$ | 19–20.5 | Cl | 0.3–0.5 |
| $Li_2O$ | 2–2.5 | Br | 0.05–0.15 |
| $Na_2O$ | 2–3 | CuO | 0.0065–0.01 |
| $K_2O$ | 6–7 | | |

At about room temperature the glasses will darken to a transmittance below 25% and, when withdrawn from actinic radiation, will fade to a transmittance at least twice that of the darkened transmittance within five minutes.

U.S. Pat. No. 4,407,966 encompasses photochromic glasses refractive index corrected and chemically strengthenable for ophthalmic applications consisting essentially, in weight percent, of

| $SiO_2$ | 56–60 | PbO | 0.1–0.15 |
| $Al_2O_3$ | 6–9 | Ag | >0.15–0.25 |
| $B_2O_3$ | 18–21 | Cl | 0.2–0.35 |
| $Li_2O$ | >2.5–3.5 | Br | 0.075–0.15 |
| $Na_2O$ | 0.5–2.5 | CuO | 0.004–0.02 |
| $K_2O$ | 5–7 | $CeO_2$ | 0–0.5 |
| $ZrO_2$ | 3.75–5 | | |

At about room temperature the glasses will darken to a transmittance below 25% and within five minutes' removal from actinic radiation will fade at least 35 units of transmittance.

U.S. Pat. No. 4,550,087 reports photochromic glasses which, over the temperature range 0°–40° C., will darken to a transmittance between about 40–60%, will exhibit good temperature independence, and, over the temperature range 25°–40° C., will fade at least 30 percentage units of transmittance within five minutes' withdrawal from actinic radiation. Those glasses consist essentially, in weight percent, of

| $Li_2O$ | 0–2.5 | $P_2O_5$ | 0–25 |
| $Na_2O$ | 0–9 | $SiO_2$ | 20–65 |
| $K_2O$ | 0–17 | Ag | 0.115–0.145 |
| $Cs_2O$ | 0–6 | Br | 0.11–0.155 |
| $Li_2O + Na_2O + K_2O + Cs_2O$ | 8–20 | Cl | 0.1–0.15 |
| $B_2O_3$ | 14–23 | $Cu_2O$ | 0.007–0.011 |
| $Al_2O_3$ | 5–25 | | | wherein the molar ratio alkali metal oxide:$B_2O_3$=0.55–0.85, the weight ratio Ag:(CL+Br)=0.65–0.95, and the sum of Ag+Br is at least 0.26%, when the Br content is 0.11%, and at least 0.25% when the Ag content is 0.115%. The refractive index suitable for ophthalmic applications can be secured by adding up to 10% total of the following ingredients in the indicated proportions of up to 6% $ZrO_2$, up to 3% $TiO_2$, up to 0.5% PbO, up to 7% BaO, up to 4% CaO, up to 3% MgO, up to 6% $Nb_2O_5$, and up to 4% $La_2O_3$.

SUMMARY OF THE INVENTION

As was explained in U.S. Pat. No. 4,550,087, whereas, in general, it was previously desired to develop photochromic glasses exhibiting very low transmittance in the darkened state, recently a great interest has arisen in photochromic glasses capable of reaching a "comfort" range of darkening; i.e., having transmissions between about 40–60%. In both of the two types of glasses, however, the users of lenses prepared therefrom have demanded rapid fading.

We have discovered a narrow range of base glass compositions which, by means of careful proportioning of the "photochromic elements", i.e., the concentrations of Ag, Cl, Br, and CuO, can provide two levels of darkening accompanied by very rapid fading. These base glass compositions consist essentially, expressed in terms of weight percent on the oxide basis, of:

| SiO$_2$ | 46–60 | MgO | 0–3.5 |
|---|---|---|---|
| B$_2$O$_3$ | 16–28 | CaO | 0–6 |
| Al$_2$O$_3$ | 4–11 | SrO | 0–6 |
| ZrO$_2$ | 2–6 | BaO | 0–6 |
| Li$_2$O | 2–5 | P$_2$O$_5$ | 0–5 |
| Na$_2$O | 0–4 | TiO$_2$ | 0–3 |
| K$_2$O | 2.5–9 | | | with the preferred base glasses consisting essentially of:

| SiO$_2$ | 50–58 | MgO | 0–1 |
|---|---|---|---|
| B$_2$O$_3$ | 16–25 | CaO | 1–4 |
| Al$_2$O$_3$ | 6–9 | SrO | 0–4 |
| ZrO$_2$ | 2–5 | BaO | 0–4 |
| Li$_2$O | >2–4.5 | P$_2$O$_5$ | 0–3.5 |
| Na$_2$O | 0.4–3.5 | TiO$_2$ | 1–2.5 |
| K$_2$O | 4–8 | | |

In the framework of the present invention, a "comfort" lens is understood as comprising a lens prepared from a glass which, in a thickness of 2 mm, exhibits the following optical and photochromic properties:

(a) a clear (untinted) luminous transmittance ($T_o$) greater than 88%;

(b) a luminous transmittance in the darkened state, i.e., after 15 minutes' exposure to actinic radiation ($T_{D15}$) over the temperature range of 0°–25° C., higher than 35%, preferably above 40%, but lower than 60%;

(c) a luminous transmittance in the darkened state, i.e., after 15 minutes' exposure to actinic radiation ($T_{D15}$) at 40° C., no higher than 63%; and (d) a fading rate at room temperature (20°–25° C.) such that, after five minutes' removal from the actinic radiation ($T_{F5}$), the glass exhibits a luminous transmittance of at least 75% and, preferably, more than 80%.

Preferably, the glasses also demonstrate the two following properties:

(A) a difference in the luminous transmittance in the darkened state over the temperature interval of 0°–25° C. of less than eight percentage units of transmittance and, preferably, less than six; and (B) a difference in the luminous transmittance in the darkened state over the temperature interval of 25°–40° C. of less than 18 percentage units of transmittance and, preferably, less than 16.

The last two parameters reflect the independence in photochromic behavior exhibited by the inventive glasses with respect to temperature.

To obtain these optical and photochromic properties requires the introduction of the photochromic elements in the following proportions, measured in terms of weight percent as analyzed in the glass:

| Ag | 0.13–0.18 | Br | 0.08–0.14 |
|---|---|---|---|
| Cl | 0.16–0.34 | CuO | 0.001–0.004 | with the preferred concentrations being:

| Ag | 0.13–0.165 | Br | 0.09–0.12 |
|---|---|---|---|
| Cl | 0.17–0.27 | CuO | 0.002–0.004 |

The development of haze has been a serious problem in the preparation of photochromic glass lenses darkening to the comfort range. It has been postulated that the mechanism on which the development of haze rests involves a necessary low content of silver which, coupled with a poor rate of nucleation, leads to the growth of large silver halide crystals which cause scattering of light. To avoid this problem, the following relationships must be satisfied:

$Ag \geq 0.13\%$ $Br:(Cl+Br) \geq 0.24$, preferably $\geq 0.30$

Furthermore, the desired photochromic properties necessitate:

$0.25 \leq Ag:(Cl+Br) \leq 0.60$, preferably $\leq 0.50$

In the framework of the present invention, a "dark" lens comprises a lens of a glass which, in a thickness of 2 mm, exhibits the following optical and photochromic properties:

(a) a luminous transmittance in the clear state ($T_o$) greater than 88%;

(b) a luminous transmittance in the darkened state, i.e., after 15 minutes' exposure to actinic radiation ($T_{D15}$) over the temperature range of 0°–25° C., lower than 35%, preferably below 30%;

(c) a luminous transmittance in the darkened state, i.e., after 15 minutes' exposure to actinic radiation ($T_{D15}$) at 40° C., lower than 58%, preferably below 55%; and (d) a fading rate at room temperature (20°–25° C.) such that, after five minutes' removal from actinic radiation ($T_{F5}$), the glass exhibits a luminous transmittance greater than about 70%.

Obtaining these optical and photochromic properties requires the presence of the photochromic elements in the proportions below, as analyzed in the glass in weight percent:

| Ag | 0.15–0.3 | Br | 0.07–0.14 |
|---|---|---|---|
| Cl | 0.2–0.45 | CuO | 0.004–0.016 | with the preferred concentrations being:

| Ag | 0.16–0.25 | Br | 0.07–0.13 |
|---|---|---|---|
| Cl | 0.2–0.35 | CuO | 0.0045–0.012 |

The limits of the ranges specified above for the constituents of the compositions of the base glass are also crucial for obtaining glasses exhibiting good melting and forming behaviors, and possessing the chemical and physical properties required of glasses utilized in optical and ophthalmic applications, as well as the desired photochromic behavior. For example:

Al$_2$O$_3$ inhibits phase separation and, in like manner to ZrO$_2$, improves the chemical durability of the glass. However, either of these oxides reduces the stability of the glass with respect to devitrification. Consequently, the following relationship must be respected:

$$6 \leq Al_2O_3 + ZrO_2 \leq 13$$

or $$6 \leq Al_2O_3 + ZrO_2 \leq 15,$$

when the glass contains $P_2O_5$

Because $B_2O_3$ can exert an adverse effect upon the chemical durability of the glass, the maximum will not exceed 28% and will preferably be lower than 25%.

The refractive index ($n_D$) can be corrected to 1.523 to render the glass useful for ophthalmic applications through adjustment of the $ZrO_2$ and $TiO_2$ contents. However, $TiO_2$ can have three harmful effects on the glass: (1) it confers an undesirable yellow tint; (2) because it absorbs ultraviolet radiation, it decreases the sensitivity of the glass to actinic radiation; and (3) it renders the glass more susceptible to phase separation.

Adjustment of refractive index can also be effected through additions of BaO, SrO, CaO, and MgO. Nevertheless, MgO tends to raise the liquidus temperature, and so will preferably be essentially absent from the composition. CaO appears to be more effective in maintaining the desired rapid fading character of the glass, so that its use will be preferred to that of BaO and SrO. In all cases the total MgO+CaO+SrO+BaO should not exceed 7%, with the preferred value comprising between 1 and 4%.

$P_2O_5$ appears to be advantageous in improving the fading rate of the glasses, but it adversely affects the chemical durability of the glass and raises its liquidus temperature. Consequently, a maximum of 5% should not be exceeded. Furthermore, $P_2O_5$ appears to increase the tendency of the glass to phase separate and, as a result of that fact, should be excluded or limited to proportions lower than 1% where the total of CaO+MgO equals at least 2%.

To obtain the desired photochromic behavior and notably great fading rates, careful control of the proportion of alkali metal oxide is indispensable. To illustrate, the cationic ratio $Li_2O$:total alkali metal content ($R_2O$) will desirably be greater than 0.4, but less than 0.8, preferably between 0.45–0.75. Furthermore, $Na_2O$ contents greater than 4% appear to adversely affect the fading rate of the glasses. On the other hand, $Na_2O$ appears to increase the mechanical strength which can be obtained through chemical strengthening of the glass. Consequently, the preferred glasses will contain at least 0.4% $Na_2O$. In like manner, to insure high mechanical strength in the glass through chemical strengthening, the preferred compositions will contain $Li_2O$ in amounts greater than 2%.

Finally, up to about 1% total of classic glass colorants such as CoO, $Er_2O_3$, MnO, and NiO can be incorporated to tint glass.

Up to about 1% $SnO_2$ or up to 4 parts/million (ppm) Pd can be added to provide a brown coloration in the darkened state.

When necessary, especially in photochromic glass compositions containing a great proportion of alkali metal and/or alkaline earth metal oxides, up to 1% by weight $As_2O_3$ and/or $Sb_2O_3$ can be introduced in order to increase the ratio $Cu^+$:Cu in the matrix.

DESCRIPTION OF PREFERRED EMBODIMENTS

Table I below presents a certain number of glass compositions, expressed in terms of parts by weight on the oxide basis, illustrating the parameters of the invention. Because the total of the individual constituents is equal to or very close to 100, the values indicated can be considered, for all practical purposes, as representing weight percent. Inasmuch as it is not known with which cation(s) the halides are combined and the proportions of them are very small, they are simply reported in the form of chlorine and bromine, in conformity with the usual practice of glass analysis. Finally, since silver is present in a very small amount, it is simply reported in the form of the metal. The actual ingredients of the glass forming batch can comprise any materials, either oxides or other compounds, which, when melted together, are converted into the desired oxide in the proper proportions. The halides are generally added in the form of alkali metal halides. The cationic ratio $Li_2O$:$R_2O$ is also indicated (L:R).

The ingredients of the glass forming batch were combined, carefully mixed together in a ball mill to promote the obtaining of a homogeneous molten mass, and then progressively transferred into a platinum crucible to be heated through the Joule effect. The glass forming batch is melted for three hours at about 1400° C. After forming, the glass is annealed at about 450° C.

Analyses of the photochromic elements have indicated losses of these during melting of about 20–25% for Cl, 45–50% for Br, 8–10% for Ag, and 0% for CuO.

TABLE I

| | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
| SiO$_2$ | 54.3 | 56.3 | 58.3 | 56.5 | 56.2 | 53.9 | 56.6 | 57.5 | 57.9 | 53.0 | 53.3 | 53.1 | 53.2 | 50.6 | 50.7 | 54.7 | 54.5 | 54.3 | 55.4 | 54.6 | 53.4 |
| B$_2$O$_3$ | 23.8 | 22.0 | 20.3 | 21.3 | 22.7 | 23.6 | 19.0 | 17.9 | 18.0 | 23.2 | 21.8 | 23.3 | 20.0 | 22.6 | 23.4 | 20.5 | 20.4 | 20.3 | 19.3 | 21.9 | 21.0 |
| Al$_2$O$_3$ | 9.0 | 8.9 | 8.8 | 8.9 | 8.9 | 8.9 | 6.2 | 6.3 | 6.9 | 8.8 | 8.8 | 8.8 | 9.4 | 8.8 | 8.8 | 8.6 | 8.5 | 8.5 | 8.7 | 7.3 | 8.5 |
| ZrO$_2$ | 2.7 | 2.7 | 2.6 | 2.7 | 2.7 | 2.7 | 5.0 | 5.0 | 3.8 | 2.6 | 2.7 | 2.6 | 3.8 | 2.7 | 2.7 | 2.6 | 2.6 | 2.6 | 2.6 | | 2.5 |
| Li$_2$O | 4.4 | 4.4 | 4.4 | 4.6 | 4.2 | 3.8 | 2.2 | 3.2 | 3.2 | 3.0 | 3.5 | 3.0 | 2.0 | 3.2 | 3.0 | 2.8 | 2.8 | 2.8 | 4.0 | 2.6 | 2.0 |
| Na$_2$O | | | | | | | | | | | | | | | | | | | | | |
| K$_2$O | | | | | | | 1.3 | 1.3 | 1.3 | | | | 0.6 | 2.0 | 2.0 | 2.0 | 1.3 | 0.6 | 0.6 | 1.9 | 1.9 |
| MgO | 5.7 | 5.6 | 5.6 | 6.0 | 5.3 | 5.7 | 7.3 | 6.3 | 6.4 | 6.6 | 6.4 | 5.6 | 7.3 | 5.1 | 4.5 | 4.0 | 4.9 | 5.9 | 4.3 | 3.6 | 6.3 |
| CaO | | | | | | | | | | 2.6 | 3.5 | 3.5 | 1.7 | 0.9 | 1.7 | | | | | | |
| P$_2$O$_5$ | | | | | | | | | | | | | 1.1 | 2.4 | 1.2 | 2.9 | 2.9 | 2.9 | 3.0 | 2.9 | 2.3 |
| Pd | | | | | | | | | | | | | | | | | | | | | |
| TiO$_2$ | | | | | | | 2.4 | 2.5 | 2.5 | | | | 0.8 | 1.7 | 1.7 | 2.0 | 2.0 | 2.0 | 2.0 | 2.0 | 2.0 |
| Ag | 0.19 | 0.19 | 0.19 | 0.19 | 0.19 | 0.19 | 0.19 | 0.19 | 0.154 | 0.23 | 0.23 | 0.23 | 0.19 | 0.19 | 0.19 | 0.23 | 0.23 | 0.23 | 0.23 | 0.23 | 0.23 |
| Cl | 0.29 | 0.31 | 0.31 | 0.31 | 0.31 | 0.29 | 0.29 | 0.29 | 0.22 | 0.27 | 0.27 | 0.27 | 0.26 | 0.31 | 0.19 | 0.32 | 0.33 | 0.32 | 0.32 | 0.32 | 0.32 |
| Br | 0.12 | 0.12 | 0.12 | 0.12 | 0.12 | 0.12 | 0.12 | 0.12 | 0.09 | 0.08 | 0.08 | 0.08 | 0.10 | 0.10 | 0.10 | 0.08 | 0.075 | 0.08 | 0.08 | 0.08 | 0.08 |
| CuO | 0.006 | 0.008 | 0.008 | 0.008 | 0.006 | 0.006 | 0.005 | 0.005 | 0.005 | 0.009 | 0.009 | 0.009 | 0.005 | 0.005 | 0.006 | 0.006 | 0.006 | 0.006 | 0.006 | 0.006 | 0.006 |
| L:R | 0.71 | 0.71 | 0.71 | 0.71 | 0.71 | 0.60 | 0.43 | 0.55 | 0.55 | 0.59 | 0.63 | 0.63 | 0.43 | 0.55 | 0.56 | 0.56 | 0.56 | 0.56 | 0.71 | 0.55 | 0.41 |

| | 22 | 23 | 24 | 25 | 26 | 27 | 28 | 29 | 30 | 31 | 32 | 33 | 34 | 35 | 36 | 37 | 38 | 39 | 40 | 41 | 42 |
|---|---|---|---|---|---|---|---|---|---|---|---|---|---|---|---|---|---|---|---|---|---|
| SiO$_2$ | 56.5 | 54.5 | 50.0 | 52.9 | 49.9 | 50.1 | 49.3 | 54.4 | 47.8 | 54.0 | 54.2 | 54.2 | 50.7 | 54.5 | 54.3 | 54.7 | 54.5 | 54.5 | 54.5 | 54.5 | 54.5 |
| B$_2$O$_3$ | 18.9 | 18.9 | 23.8 | 20.7 | 20.5 | 19.1 | 21.9 | 21.5 | 24.0 | 26.1 | 23.8 | 21.7 | 23.4 | 20.4 | 21.8 | 20.5 | 20.4 | 20.4 | 20.4 | 20.4 | 20.4 |
| Al$_2$O$_3$ | 8.5 | 8.5 | 8.5 | 9.0 | 9.5 | 9.6 | 9.3 | 8.9 | 11.0 | 6.5 | 9.0 | 8.8 | 8.8 | 8.5 | 8.5 | 8.6 | 8.5 | 8.5 | 8.5 | 8.5 | 8.5 |
| ZrO$_2$ | 2.6 | 2.6 | 3.1 | 3.5 | 4.7 | 4.8 | 3.3 | 2.6 | 2.6 | 2.6 | 2.7 | 4.0 | 2.7 | 2.6 | 2.6 | 2.6 | 2.6 | 2.6 | 2.6 | 2.6 | 2.6 |
| Li$_2$O | 2.8 | 3.1 | 2.9 | 4.4 | 4.3 | 4.8 | 2.5 | 2.8 | 2.8 | 3.2 | 4.4 | 4.2 | 3.0 | 2.8 | 2.4 | 2.8 | 2.8 | 2.8 | 2.8 | 2.8 | 2.8 |
| Na$_2$O | 1.9 | 0.6 | 0.7 | 0.8 | 0.8 | 0.8 | 0.8 | | | | | | 2.0 | | 1.3 | 1.9 | | | | | |
| K$_2$O | 3.9 | 6.7 | 6.0 | 6.1 | 6.1 | 6.7 | 8.9 | 6.0 | 5.2 | 4.0 | 5.7 | 5.4 | 4.6 | 1.3 | 1.3 | 4.0 | 1.3 | 1.3 | 1.3 | 1.3 | 1.3 |
| MgO | 0.8 | | | | | | | | 3.4 | | | | 1.7 | 4.9 | 4.2 | | 4.9 | 4.9 | 4.9 | 4.9 | 4.9 |
| CaO | 2.3 | 2.9 | 3.0 | 1.5 | 3.0 | 3.0 | 3.0 | 3.4 | | | | | 1.2 | 2.9 | 2.9 | 2.9 | 2.9 | 2.9 | 2.9 | 2.9 | 2.9 |
| P$_2$O$_5$ | | | | | | | | 0.3 | 3.0 | | | | | | | | | | | | |
| Pd | | | | | | | | | | | | | | | | | | | | | |
| TiO$_2$ | 1.7 | 2 | 1.7 | 1.0 | 1.0 | 1.0 | 1.0 | | | 3.4 | | | 2.0 | 2.0 | 2.0 | 2.0 | 2.0 | 2.0 | 2.0 | 2.0 | 2.0 |
| Ag | 0.19 | 0.23 | 0.15 | 0.23 | 0.15 | 0.192 | 0.177 | 0.23 | 0.22 | 0.18 | 0.20 | 0.17 | 0.14 | 0.18 | 0.17 | 0.14 | 0.148 | 0.154 | 0.164 | 0.163 | 0.185 |
| Cl | 0.35 | 0.32 | 0.37 | 0.35 | 0.18 | 0.26 | 0.21 | 0.39 | 0.39 | 0.27 | 0.20 | 0.27 | 0.18 | 0.23 | 0.23 | 0.23 | 0.234 | 0.228 | 0.207 | 0.25 | 0.24 |
| Br | 0.08 | 0.08 | 0.10 | 0.09 | 0.14 | 0.132 | 0.10 | 0.10 | 0.10 | 0.10 | 0.10 | 0.10 | 0.10 | 0.10 | 0.10 | 0.10 | 0.132 | 0.130 | 0.099 | 0.097 | 0.135 |
| CuO | 0.005 | 0.010 | 0.0054 | 0.009 | 0.005 | 0.008 | 0.005 | 0.007 | 0.009 | 0.006 | 0.004 | 0.002 | 0.002 | 0.002 | 0.002 | 0.003 | 0.003 | 0.0019 | 0.003 | 0.003 | 0.003 |
| L:R | 0.56 | 0.57 | 0.53 | 0.65 | 0.65 | 0.65 | 0.44 | 0.6 | 0.63 | 0.71 | 0.71 | 0.71 | 0.59 | 0.56 | 0.55 | 0.56 | 0.56 | 0.56 | 0.56 | 0.56 | 0.56 |

| | 43 | 44 | 45 | 46 | 47 | 48 | 49 | 50 | 51 | 52 | 53 | 54 | 55 | 56 | 57 | 58 | 59 | 60 | 61 | 62 | 63 |
|---|---|---|---|---|---|---|---|---|---|---|---|---|---|---|---|---|---|---|---|---|---|
| SiO$_2$ | 54.5 | 54.5 | 54.5 | 54.5 | 54.5 | 54.5 | 54.5 | 54.5 | 54.5 | 54.5 | 54.5 | 54.5 | 54.5 | 54.5 | 54.5 | 54.5 | 54.5 | 54.5 | 54.5 | 54.5 | 54.5 |
| B$_2$O$_3$ | 20.4 | 20.4 | 20.4 | 20.4 | 20.4 | 20.4 | 20.4 | 20.4 | 20.4 | 20.4 | 20.4 | 20.4 | 20.4 | 20.4 | 20.4 | 20.4 | 20.4 | 20.4 | 20.4 | 20.4 | 20.4 |
| Al$_2$O$_3$ | 8.5 | 8.5 | 8.5 | 8.5 | 8.5 | 8.5 | 8.5 | 8.5 | 8.5 | 8.5 | 8.5 | 8.5 | 8.5 | 8.5 | 8.5 | 8.5 | 8.5 | 8.5 | 8.5 | 8.5 | 8.5 |
| ZrO$_2$ | 2.6 | 2.6 | 2.6 | 2.6 | 2.6 | 2.6 | 2.6 | 2.6 | 2.6 | 2.6 | 2.6 | 2.6 | 2.6 | 2.6 | 2.6 | 2.6 | 2.6 | 2.6 | 2.6 | 2.6 | 2.6 |
| Li$_2$O | 2.8 | 2.8 | 2.8 | 2.8 | 2.8 | 2.8 | 2.8 | 2.8 | 2.8 | 2.8 | 2.8 | 2.8 | 2.8 | 2.8 | 2.8 | 2.8 | 2.8 | 2.8 | 2.8 | 2.8 | 2.8 |
| Na$_2$O | | | | | | | | | | | | | | | | | | | | | |
| K$_2$O | 1.3 | 1.3 | 1.3 | 1.3 | 1.3 | 1.3 | 1.3 | 1.3 | 1.3 | 1.3 | 1.3 | 1.3 | 1.3 | 1.3 | 1.3 | 1.3 | 1.3 | 1.3 | 1.3 | 1.3 | 1.3 |
| MgO | 4.9 | 4.9 | 4.9 | 4.9 | 4.9 | 4.9 | 4.9 | 4.9 | 4.9 | 4.9 | 4.9 | 4.9 | 4.9 | 4.9 | 4.9 | 4.9 | 4.9 | 4.9 | 4.9 | 4.9 | 4.9 |
| CaO | 2.9 | 2.9 | 2.9 | 2.9 | 2.9 | 2.9 | 2.9 | 2.9 | 2.9 | 2.9 | 2.9 | 2.9 | 2.9 | 2.9 | 2.9 | 2.9 | 2.9 | 2.9 | 2.9 | 2.9 | 2.9 |

TABLE I-continued

| P$_2$O$_5$ | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 |
|---|---|---|---|---|---|---|---|---|---|---|---|---|---|---|---|---|---|---|---|---|---|
| Pd | 0.136 | 0.097 | 0.108 | 0.114 | 0.134 | 0.131 | 0.138 | 0.147 | 0.143 | 0.137 | 0.143 | 0.154 | 0.163 | 0.18 | 0.141 | 0.152 | 0.148 | 0.145 | 0.15 | 0.142 | 0.143 |
| TiO$_2$ | 0.228 | 0.237 | 0.231 | 0.221 | 0.227 | 0.254 | 0.25 | 0.248 | 0.172 | 0.231 | 0.233 | 0.231 | 0.236 | 0.223 | 0.235 | 0.273 | 0.322 | 0.223 | 0.241 | 0.172 | 0.243 |
| Ag | — | — | — | — | — | — | — | — | — | — | — | — | — | — | — | — | — | — | — | — | — |
| Cl | 0.105 | 0.104 | 0.104 | 0.103 | 0.106 | 0.07 | 0.07 | 0.08 | 0.113 | 0.105 | 0.11 | 0.105 | 0.103 | 0.103 | 0.109 | 0.111 | 0.107 | 0.103 | 0.098 | 0.113 | 0.109 |
| Br | 0.0025 | 0.002 | 0.002 | 0.002 | 0.002 | 0.002 | 0.002 | 0.002 | 0.002 | 0.0028 | 0.0029 | 0.0027 | 0.0029 | 0.0023 | 0.0028 | 0.0022 | 0.0022 | 0.0024 | 0.0028 | 0.0034 | 0.0014 |
| CuO | — | — | — | — | — | — | — | — | — | — | — | — | — | — | — | — | — | — | — | — | — |
| L:R | 0.56 | 0.56 | 0.56 | 0.56 | 0.56 | 0.56 | 0.56 | 0.56 | 0.56 | 0.56 | 0.56 | 0.56 | 0.56 | 0.56 | 0.56 | 0.56 | 0.56 | 0.56 | 0.56 | 0.56 | 0.56 |

The glass samples presented above were introduced into an electrically-heated furnace (sample dimensions 4 cm×4 cm×0.4 cm) and exposed to the times in minutes and temperatures in °C. indicated in Tables II–IX to develop photochromism in them. The samples were then removed from the furnace and thereafter ground and polished to a thickness of about 2 mm. (In general, temperatures between about 600°–675° C. have been determined to be satisfactory.) Tables II–IX also report measurements of the photochromic behavior ($T_o$, $T_{D15}$, $T_{f5}$) exhibited by the polished samples, utilizing the solar simulator apparatus whose principle is described in U.S. Pat. No. 4,190,451.

The color of the glasses in the clear and darkened state is defined by the trichromatic coordinates [respectively ($x_o$, $y_o$), ($x_D$, $y_D$)] determined through the trichromatic colorimetric system of the C.I.E. of 1931 utilizing Illuminant C as the light source. This colorimetric system and light source are explained by A. C. Hardy in the *Handbook of Colorimetry*, Technology Press M.I.T., Cambridge, Mass. (1936).

The color in the darkened glass ($x_D$, $y_D$), is determined after an exposure of 20 minutes at 25° C. under a source of ultraviolet light ("Black light-blue lamp"). Finally, Tables VII–IX indicate the weight ratios Ag:(Cl+Br) and Br:(Cl+Br).

In the tables below:

$T_o$ designates the luminous transmittance of a glass in the clear (undarkened) state;

$T_{D15}(0)$ designates the luminous transmittance of a glass in the darkened state after 15 minutes' exposure to the solar simulator source of actinic radiation at 0° C.;

$T_{D15}(25)$ designates the luminous transmittance of a glass in the darkened state after 15 minutes' exposure to the solar simulator source of actinic radiation at 25° C.;

$T_{D15}(40)$ designates the luminous transmittance of a glass in the darkened state after 15 minutes' exposure to the solar simulator source of actinic radiation at 40° C.;

$\Delta TD(0-25)$ designates the difference in luminous transmittance of a glass in the darkened state over the temperature range of 0°–25° C.;

$\Delta TD(25-40)$ designates the difference in luminous transmittance of a glass in the darkened state over the temperature range of 25°–40° C.; and $T_{F5}(25)$ designates the faded luminous transmittance of a glass after five minutes' removal from the solar simulator source of actinic radiation at 25° C.

TABLE II

|  | 1 | 2 | 3 | 4 | 5 | 6 | 7 | 8 | 9 |
|---|---|---|---|---|---|---|---|---|---|
| Heat Treatment | 30-640 | 30-640 | 30-640 | 30-640 | 30-640 | 30-640 | 30-640 | 30-640 | 30-640 |
| $T_o$ | 90.1 | 91.2 | 91.5 | 90 | 90.9 | 91.4 | 92.5 | 92.3 | 91.4 |
| $T_{D15}(0)$ | — | — | 10 | 12 | — | 19 | 17.2 | — | — |
| $T_{D15}(25)$ | 24.9 | 26.3 | 23.6 | 23.5 | 24 | 32.6 | 28.7 | 25.9 | 31.9 |
| $T_{D15}(40)$ | 47.1 | 50.2 | 48.1 | 45.6 | 48 | 59.3 | 52.6 | 54.2 | 54.3 |
| $\Delta TD(0-25)$ | — | — | 13.6 | 11.5 | — | 13.6 | 11.5 | — | — |
| $\Delta TD(25-40)$ | 22.2 | 23.9 | 24.5 | 21.9 | 24 | 26.7 | 23.9 | 28.3 | 22.4 |
| $T_{F5}(25)$ | 74.6 | 77 | 73.3 | 72.5 | 75.6 | 83.8 | 79.8 | 75.1 | 76.6 |

Examples 1–9 are representative of dark photochromic glass compositions which contain no alkaline earth oxides.

TABLE III

|  | 10 | 11 | 12 | 13 | 14 | 15 | 16 | 17 |
|---|---|---|---|---|---|---|---|---|
| Treatment | 30-660 | 30-660 | 30-660 | 30-660 | 30-640 | 30-650 | 30-650 | 30-640 |
| $T_o$ | 89.6 | 90.2 | 90.5 | 91.4 | 89.5 | 90.9 | 92.5 | 92.3 |
| $T_{D15}(0)$ | — | — | — | — | 30.5 | — | — | 15.4 |
| $T_{D15}(25)$ | 29 | 28 | 32 | 25.4 | 34 | 33 | 34.4 | 31.9 |
| $T_{D15}(40)$ | 56 | 55 | 56 | 48.5 | 50 | 56 | 57 | 54.9 |
| $\Delta TD(0-25)$ | — | — | — | — | 3.5 | — | — | 16.5 |
| $\Delta TD(25-40)$ | 27 | 27 | 24 | 23.1 | 16 | 23 | 22.6 | 23 |
| $T_{F5}(25)$ | 81 | 78 | 82 | 75.4 | 76 | 81 | 78.7 | 79.4 |

|  | 18 | 19 | 20 | 21 | 22 | 23 | 24 |
|---|---|---|---|---|---|---|---|
| Treatment | 30-640 | 30-640 | 30-650 | 30-640 | 30-650 | 30-640 | 30-640 |
| $T_o$ | 92.5 | 92.1 | 92 | 92.2 | 91.2 | 92.4 | 91 |
| $T_{D15}(0)$ | — | — | — | 14.9 | — | — | 16 |
| $T_{D15}(25)$ | 28.1 | 30 | 34.2 | 30.2 | 32.4 | 26 | 25 |
| $T_{D15}(40)$ | 50.3 | 47.8 | 57.7 | 53.7 | 55.4 | 48.3 | 47 |
| $\Delta TD(0-25)$ | — | — | — | 15.3 | — | — | 9 |
| $\Delta TD(25-40)$ | 22.2 | 17.8 | 23.5 | 23.5 | 23 | 22.3 | 22 |
| $T_{F5}(25)$ | 78.8 | 70.2 | 78.7 | 78.1 | 75.2 | 73 | 75 |

Examples 10–24 are representative of dark photochromic glass compositions which contain alkaline earth oxides.

TABLE IV

|  | 25 | 26 | 27 | 28 | 29 | 30 | 31 |
|---|---|---|---|---|---|---|---|
| Treatment | 30-620 | 30-630 | 30-630 | 30-630 | 30-660 | Phase separated | 30-640 |
| $T_o$ | 91.2 | 91.5 | 91 | 91.4 | 91.1 |  | 76.1 |
| $T_{D15}(0)$ | — | 21 | — | 18 | — |  | — |
| $T_{D15}(25)$ | 28 | 33 | 29 | 25 | 25 |  | 54.6 |
| $T_{D15}(40)$ | 55 | 57 | 58 | 49 | 53 |  | 65.8 |
| $\Delta TD(0-25)$ | — | 12 | — | 7 | — |  | — |
| $\Delta TD(25-40)$ | 27 | 24 | 29 | 24 | 18 |  | 11.2 |
| $T_{F5}(25)$ | 78 | 84 | 83 | 75.6 | 78 |  | 73.1 |

Examples 25-31 are representative of dark photochromic glass compositions which contain $P_2O_5$. Example 30 illustrates the incompatibility that exists between MgO and $P_2O_5$. The substantial reduction in $T_o$ caused by an excess of $TiO_2$ can be observed in Example 31.

TABLE V

|  | 32 | 33 | 34 | 35 | 36 | 37 |
|---|---|---|---|---|---|---|
| Treatment | 30-640 | 30-640 | 30-640 | 30-650 | 30-650 | 30-640 |
| $T_o$ | 91 | 91 | 90 | 92 | 91.9 | 91.6 |
| $T_{D15}(0)$ | 36 | 44.8 | 58 | 49.5 | — | 44.4 |
| $T_{D15}(25)$ | 38 | 46 | 58.1 | 49.5 | 47.3 | 44.1 |
| $T_{D15}(40)$ | 53 | 53.6 | 61.5 | 53.1 | 55.8 | 51.7 |
| $\Delta TD(0-25)$ | 2 | 1.2 | 0.1 | 0 | — | 0.3 |
| $\Delta TD(25-40)$ | 15 | 7.6 | 3.4 | 3.6 | 8.5 | 7.6 |
| $T_{F5}$ | 84 | 81.9 | 83 | 77.5 | 83.7 | 80.2 |

Examples 32-37 are representative of comfort photochromic glasses having different base compositions. It should be noted that Examples 18 and 37 have similar base compositions but different levels of Ag, Cl, Br, and CuO. A like situation is present with respect to Examples 19 and 35.

TABLE VI

|  | 38 | 39 | 40 | 41 | 42 | 43 |
|---|---|---|---|---|---|---|
| Heat Treatment | 15-650 | 15-650 | 15-650 | 15-650 | 15-650 | 15-650 |
| $T_o$ | 91.7 | 91.6 | 91.7 | 92 | 91.7 | 91.7 |
| $T_{D15}(0)$ | 35 | — | 47.2 | 42.5 | 31.5 | 44.2 |
| $T_{D15}(25)$ | 41.5 | 48.2 | 48 | 43.7 | 37 | 46.8 |
| $T_{D15}(40)$ | 59 | 53.3 | 56.4 | 53.9 | 53 | 57.7 |
| $\Delta TD(0-25)$ | 6.5 | — | 1.2 | 1.2 | 6.5 | 2.6 |
| $\Delta TD(25-40)$ | 7.5 | 4.9 | 6.4 | 10.2 | 16 | 10.9 |
| $T_{F5}$ | 82.4 | 81.4 | 80.3 | 80.3 | 79.7 | 82 |
| $x_o$ | 0.3134 | — | 0.3124 | — | 0.3135 | 0.3121 |
| $y_o$ | 0.3230 | — | 0.3216 | — | 0.3234 | 0.3217 |
| $x_D$ | 0.3211 | — | 0.3214 | — | 0.3229 | 0.3186 |
| $y_D$ | 0.3231 | — | 0.3229 | — | 0.3236 | 0.3212 |
| Ag:(Cl + Br) | 0.40 | 0.43 | 0.53 | 0.47 | 0.48 | 0.41 |
| Br:(Cl + Br) | 0.36 | 0.36 | 0.32 | 0.28 | 0.36 | 0.31 |

Examples 38-43 are representative of comfort photochromic glasses which have the same base composition as Example 35, but contain varying amounts of Ag, Cl, and Br. It should be noted that the Ag content of Example 42 is in excess of that prescribed for comfort glasses and, hence, Example 42 is, in reality, a dark photochromic glass.

Table VII below illustrates the effect of the Ag content and the ratio Br:(Cl+Br) on the development of haze in the glass during the heat treatment process. As defined here, haze corresponds to the intensity of diffused light exhibited by the polished samples as measured optically. The level of haze is expressed in an arbitrary scale of units; an acceptable value of haze on that scale being less than 40. Examples 44-51 have the base composition of Example 35. A comparison of Examples 47, 50, and 51 with Examples 48 and 49 demonstrates the effect which the ratio Br:(Cl+Br) has upon the development of haze. Examples 44-46 contain insufficient Ag.

TABLE VII

|  | 44 | 45 | 46 | 47 | 48 | 49 | 50 | 51 |
|---|---|---|---|---|---|---|---|---|
| Heat Treatment | 15-650 | 15-650 | 15-650 | 15-650 | 15-650 | 15-650 | 15-650 | 15-650 |
| Br: (Cl + Br) | 0.30 | 0.31 | 0.32 | 0.32 | 0.21 | 0.22 | 0.24 | 0.39 |
| Haze | 390 | 190 | 150 | 27 | 60 | 45 | 26 | 17 |

Table VIII below illustrates the effect of varying Ag contents on photochromic properties. Examples 52-56 have the base composition of Example 35 except for modifications in the levels of the photochromic elements and the addition of Pd, which imparts a brown coloration to the glasses in the darkened state. Both the ratio Ag:(Cl+Br) and the ratio Br:(Cl+Br) are provided.

TABLE VIII

|  | 52 | 53 | 54 | 55 | 56 |
|---|---|---|---|---|---|
| Heat Treatment | 15-650 | 15-650 | 15-650 | 15-650 | 15-650 |
| $T_o$ | 89.7 | 89.6 | 89.6 | 89.5 | 89.3 |
| $T_{D15}(0)$ | 40 | 40.6 | 39.8 | 39.6 | 38.3 |
| $T_{D15}(25)$ | 44.6 | 43.4 | 43.2 | 41.8 | 40.6 |
| $T_{D15}(40)$ | 61.8 | 59 | 59.2 | 56 | 53.3 |
| $\Delta TD(0-25)$ | 4.6 | 2.8 | 3.4 | 2.2 | 2.3 |
| $\Delta TD(25-40)$ | 17.2 | 15.6 | 16 | 14.2 | 12.7 |
| $T_{F5}(25)$ | 83.3 | 81.6 | 82.3 | 80.3 | 78.2 |
| $x_o$ | 0.3143 | 0.3146 | 0.3146 | 0.3148 | 0.3153 |
| $y_o$ | 0.3241 | 0.3244 | 0.3243 | 0.3246 | 0.3252 |
| $x_D$ | 0.3364 | 0.3341 | 0.3398 | 0.3368 | 0.3376 |
| $y_D$ | 0.3345 | 0.3335 | 0.3359 | 0.3368 | 0.3376 |
| Ag: (Cl + Br) | 0.41 | 0.42 | 0.46 | 0.48 | 0.55 |
| Br: (Cl + Br) | 0.31 | 0.32 | 0.31 | 0.30 | 0.32 |

Table IX below demonstrates the effect varying amounts of Cl and CuO can have upon the photochromic behavior of the glass. Examples 57-63 have the base composition of Example 35, but with differing amounts of the photochromic elements and the addition of Pd which confers a brown tint to the glass in the darkened state. Again, the ratios Ag:(Cl+Br) and Br:(Cl+Br) are provided.

TABLE IX

|  | 57 | 58 | 59 | 60 | 61 | 62 | 63 |
| --- | --- | --- | --- | --- | --- | --- | --- |
| Treatment | 15-650 | 15-650 | 15-650 | 15-650 | 15-650 | 15-650 | 15-650 |
| $T_o$ | 90 | 89.7 | 89 | 90 | 90.3 | 89.8 | 89.3 |
| $T_{D15}(0)$ | 41.2 | 39 | 46 | 45.7 | 40.3 | 45.8 | 54.8 |
| $T_{D15}(25)$ | 45.5 | 42.1 | 39.2 | 47.4 | 43.9 | 49.4 | 55.1 |
| $T_{D15}(40)$ | 62.2 | 57.5 | 52.7 | 60.3 | 59.6 | 63 | 62.5 |
| $\Delta TD(0-25)$ | 4.3 | 2.1 | 3.2 | 1.7 | 3.6 | 3.6 | 0.3 |
| $\Delta TD(25-40)$ | 16.7 | 15.4 | 13.5 | 12.9 | 15.7 | 13.6 | 7.4 |
| $T_{F5}(25)$ | 83.9 | 78.9 | 75.3 | 82.5 | 82 | 83.7 | 81.6 |
| $x_o$ | 0.3146 | 0.3146 | 0.3148 | 0.3132 | 0.3131 | 0.3147 | 0.3145 |
| $y_o$ | 0.3244 | 0.3245 | 0.3246 | 0.3204 | 0.3206 | 0.3247 | 0.3246 |
| $x_D$ | 0.3340 | 0.3345 | 0.3318 | 0.3380 | 0.3415 | 0.3328 | 0.3297 |
| $y_D$ | 0.3333 | 0.3335 | 0.3309 | 0.3330 | 0.3335 | 0.3337 | 0.3327 |
| Ag: (Cl + Br) | 0.41 | 0.40 | 0.34 | 0.43 | 0.44 | 0.50 | 0.41 |
| Br: (Cl + Br) | 0.32 | 0.29 | 0.25 | 0.31 | 0.29 | 0.40 | 0.31 |

Examples 5, 18, 40, 43, 60, and 61 are illustrative of our most preferred embodiments of the inventive glasses, not only because of their photochromic properties, but also in view of their general physical and chemical properties. The photochromic elements are present in such miniscule amounts that their effect upon the general physical and chemical properties of a glass is essentially negligible. Inasmuch as the base compositions of the five glasses are quite similar, Table X records average values of several properties measured on those glasses, utilizing techniques conventional in the glass art.

| | |
| --- | --- |
| Liquidus viscosity (poises) | ~3000 |
| Softening point (°C.) | ~663 |
| Annealing point (°C.) | ~578 |
| Strain point (°C.) | ~524 |
| Coefficient of thermal expansion (25°-300° C.) | $58 \times 10^{-7}$/°C. |
| Refractive index ($n_D$) | 1.523 |
| Density (g/cm$^3$) | 2.37 |
| Chemical Durability: Loss of weight in the "A.O." test (mg/cm$^2$) | <0.001 |

We claim:

1. A transparent, comfort photochromic glass which, in bodies of 2 mm cross section, will exhibit the following optical properties:
   (a) a clear (undarkened) luminous transmittance higher than 88%;
   (b) a darkened luminous transmittance after 15 minutes' exposure to actinic radiation over the temperature range of 0°–25° C. higher than 35%, but less than 60%;
   (c) a darkened luminous transmittance after 15 minutes' exposure to actinic radiation at a temperature of 40° C. lower than 63%; and
   (d) a faded luminous transmittance after five minutes' removal from actinic radiation of at least 75%;
   said glass having a base composition consisting essentially, expressed in terms of weight percent on the oxide basis, of about

| | | | |
| --- | --- | --- | --- |
| SiO$_2$ | 46-60 | MgO | 0-3.5 |
| B$_2$O$_3$ | 16-28 | CaO | 0-6 |
| Al$_2$O$_3$ | 4-11 | SrO | 0-6 |
| ZrO$_2$ | 2-6 | BaO | 0-6 |
| Al$_2$O$_3$ + ZrO$_2$ | 6-13 | MgO + CaO + SrO + BaO | 1-7 |
| Li$_2$O | 2-5 | P$_2$O$_5$ | 0-5 |
| Na$_2$O | 0-4 | TiO$_2$ | 0-3 |
| K$_2$O | 2.5-9 | | | and containing photochromic elements, as analyzed in weight percent, of about

| | | | |
| --- | --- | --- | --- |
| Ag | 0.13-0.18 | Br | 0.08-0.14 |
| Cl | 0.16-0.34 | CuO | 0.001-0.004 | said photochromic elements satisfying the ratios

Br:(Cl+Br)≧0.24 and 0.25≦Ag:(Cl+Br)≦0.60 and wherein 6≦Al$_2$O$_3$+ZrO$_2$≦15, when the composition contains P$_2$O$_5$, and wherein the cationic ratio Li$_2$O:Li$_2$O+Na$_2$O+K$_2$O=0.4–0.8.

2. A photochromic glass according to claim 1 wherein said base composition consists essentially of about

| | | | |
| --- | --- | --- | --- |
| SiO$_2$ | 50-58 | MgO | 0-1 |
| B$_2$O$_3$ | 16-25 | CaO | 1-4 |
| Al$_2$O$_3$ | 6-9 | SrO | 0-4 |
| ZrO$_2$ | 2-5 | BaO | 0-4 |
| Al$_2$O$_3$ + ZrO$_2$ | 6-13 | MgO + CaO + SrO + BaO | 1-4 |
| Li$_2$O | 2-4.5 | P$_2$O$_5$ | 0-3.5 |
| Na$_2$O | 0.4-3.5 | TiO$_2$ | 1-2.5 |
| K$_2$O | 4-8 | | | wherein the cationic ratio Li$_2$O:Li$_2$O+Na$_2$O+K$_2$O=0.45–0.75.

3. A photochromic glass according to claim 1 containing photochromic elements, as analyzed in weight percent, of about

| | | | |
| --- | --- | --- | --- |
| Ag | 0.13-0.165 | Br | 0.09-0.12 |
| Cl | 0.17-0.27 | CuO | 0.002-0.004 | said photochromic elements satisfying the ratios

Br:(Cl+Br)≧0.30 and 0.25≦Ag:(Cl+Br)≦0.50.

4. A photochromic glass according to claim 1 also containing up to 4 ppm Pd.

5. A transparent, dark photochromic glass which, in bodies of 2 mm cross section, will exhibit the following optical properties:
   (a) a clear (undarkened) luminous transmittance higher than 88%;
   (b) a darkened luminous transmittance after 15 minutes' exposure to actinic radiation over the temperature range of 0°–25° C. lower than 35%;

(c) a darkened luminous transmittance after 15 minutes' exposure to actinic radiation at a temperature of 40° C. lower than 58%; and (d) a faded luminous transmittance after five minutes' removal from actinic radiation of at least 70%;

said glass having a base composition consisting essentially, expressed in terms of weight percent on the oxide basis, of about

| SiO$_2$ | 46–60 | MgO | 0–3.5 |
|---|---|---|---|
| B$_2$O$_3$ | 16–28 | CaO | 0–6 |
| Al$_2$O$_3$ | 4–11 | SrO | 0–6 |
| ZrO$_2$ | 2–6 | BaO | 0–6 |
| Al$_2$O$_3$ + ZrO$_2$ | 6–13 | MgO + CaO + SrO + BaO | 1–7 |
| Li$_2$O | 2–5 | P$_2$O$_5$ | 0–5 |
| Na$_2$O | 0–4 | TiO$_2$ | 0–3 |
| K$_2$O | 2.5–9 | | | and containing photochromic elements, as analyzed in weight percent, of about

| Ag | 0.15–0.3 | Br | 0.07–0.14 |
|---|---|---|---|
| Cl | 0.2–0.45 | CuO | 0.004–0.016 | said photochromic elements satisfying the ratios

Br:(Cl+Br)≧0.24 and 0.25≦Ag:(Cl+Br)≦0.60 and wherein 6≦Al$_2$O$_3$+ZrO$_2$≦15, when the composition contains P$_2$O$_5$, and wherein the cationic ratio Li$_2$O:Li$_2$O+Na$_2$O+K$_2$O=0.4–0.8.

6. A photochromic glass according to claim 5 wherein said base composition consists essentially of about

| SiO$_2$ | 50–58 | MgO | 0–1 |
|---|---|---|---|
| B$_2$O$_3$ | 16–25 | CaO | 1–4 |
| Al$_2$O$_3$ | 6–9 | SrO | 0–4 |
| ZrO$_2$ | 2–5 | BaO | 0–4 |
| Al$_2$O$_3$ + ZrO$_2$ | 6–13 | MgO + CaO + SrO + BaO | 1–4 |
| Li$_2$O | 2–4.5 | P$_2$O$_5$ | 0–3.5 |
| Na$_2$O | 0.4–3.5 | TiO$_2$ | 1–2.5 |
| K$_2$O | 4–8 | | | wherein the cationic ratio Li$_2$O:Li$_2$O+Na$_2$O+K$_2$O=0.45–0.75.

7. A photochromic glass according to claim 5 containing photochromic elements, as analyzed in weight percent, of about

| Ag | 0.16–0.25 | Br | 0.07–0.13 |
|---|---|---|---|
| Cl | 0.2–0.35 | CuO | 0.0045–0.12 |

8. A photochromic glass according to claim 5 also containing up to 4 ppm Pd.

* * * * *